United States Patent
Childress, Jr. et al.

(10) Patent No.: US 11,587,321 B2
(45) Date of Patent: Feb. 21, 2023

(54) ENHANCED PERSON DETECTION USING FACE RECOGNITION AND REINFORCED, SEGMENTED FIELD INFERENCING

(71) Applicant: Plantronics, Inc., Santa Cruz, CA (US)

(72) Inventors: Rommel Gabriel Childress, Jr., Cedar Park, TX (US); Alain Elon Nimri, Austin, TX (US); Stephen Paul Schaefer, Cedar Park, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 16/949,084

(22) Filed: Oct. 13, 2020

(65) Prior Publication Data
US 2021/0319233 A1 Oct. 14, 2021

Related U.S. Application Data

(60) Provisional application No. 63/009,340, filed on Apr. 13, 2020.

(51) Int. Cl.
*G06V 20/40* (2022.01)
*H04N 7/15* (2006.01)
*G06V 40/10* (2022.01)
*G06V 40/16* (2022.01)

(52) U.S. Cl.
CPC .............. *G06V 20/49* (2022.01); *G06V 40/10* (2022.01); *G06V 40/161* (2022.01); *H04N 7/15* (2013.01)

(58) Field of Classification Search
CPC .......... H04N 7/15; H04N 7/04; G06K 9/0074; G06K 9/00228
USPC ............................................. 348/14.02–14.9
See application file for complete search history.

(56) References Cited

U.S. PATENT DOCUMENTS

| | | | |
|---|---|---|---|
| 10,972,655 B1 * | 4/2021 | Ostap | H04N 5/23296 |
| 2009/0245649 A1 | 10/2009 | Nakatsuka | |
| 2010/0014755 A1 | 1/2010 | Wilson | |
| 2012/0127261 A1 * | 5/2012 | Okada | H04N 7/15 348/E7.078 |
| 2016/0366425 A1 * | 12/2016 | Nagamine | H04L 12/184 |
| 2018/0082264 A1 | 3/2018 | Szeto | |
| 2019/0007623 A1 * | 1/2019 | Wang | G06V 40/103 |
| 2019/0294906 A1 * | 9/2019 | Sato | G06V 40/161 |
| 2019/0341050 A1 | 11/2019 | Diamant | |

OTHER PUBLICATIONS

PCT/US2021/026037 International Search Report and Written Opinion, dated Jul. 6, 2021.

* cited by examiner

*Primary Examiner* — Maria El-Zoobi

(57) ABSTRACT

The frame or image of a video stream of a videoconference is divided into a series of segments for analysis. There is a primary grid, which covers the entire frame, and an alternate grid, which is shifted from the primary grid. Each segment is small enough to allow a neural network to efficiently operate on the segment without requiring downsampling. By operating on full resolution images, a participant can be identified at a greater distance from the camera. The entire frame is analyzed at a lower frequency, such as once per five seconds, but each segment containing a participant in the conference is scanned at a higher frequency, such as once per second, to maintain responsiveness to participant movement but also allow the full resolution operation.

20 Claims, 6 Drawing Sheets

ENHANCED PERSON DETECTION USING FACE RECOGNITION AND REINFORCED, SEGMENTED FIELD INFERENCING

CROSS-REFERENCE

This application claims priority to U.S. Provisional Application Ser. No. 63/009,340, filed Apr. 13, 2020, the contents of which are incorporated herein in their entirety by reference.

TECHNICAL FIELD

This disclosure relates generally to videoconferencing and relates particularly to detection of individuals in one or more captured audio-visual streams.

BACKGROUND

During a videoconference, it is desirable to find the locations of participants, either as speakers or simply as attendees. Knowing the locations allows better framing decisions to make the experience more pleasurable to remote viewers. Neural networks have become very good at accurately finding individuals, either through face finding techniques or body finding techniques or some combination. However, neural networks are computationally intensive. Videoconference devices often have limited processing capabilities and have many tasks to perform besides finding individuals. To limit the processing resources utilized by a neural network performing face or body finding, the received images are often downsampled, such as from 1920 by 1080 for a full high definition (HD) input image stream to 256 by 256. While this downsampling limits the resources used in the participant finding process, the downsampling also limits the distance the participant can be from the camera. As the participant becomes farther from the camera, the number of pixels remaining to be analyzed quickly becomes too small for even the most advanced neural networks to correctly identify a participant. The participant could be farther from the camera if downsampling was not performed, but analyzing the full image using neural network techniques is too computationally intensive to allow any such analysis to be done on at a frequency to allow reasonable tracking of participant movement and still allow operation of the remaining tasks of the videoconferencing device. So, the videoconferencing device is developed with a choice of better participant tracking of just closer participants using downsampled images or detection of farther participants at the expense of participant tracking smoothness.

SUMMARY

In examples described below, the frame or image of a video stream of a videoconference is divided into a series of segments for analysis. There is a primary grid, which covers the entire frame, and an alternate grid, which is shifted from the primary grid. Each segment is made small enough to allow a neural network to efficiently operate on the segment without requiring downsampling. By operating on full resolution images, a participant can be identified at a greater distance from the camera. The entire frame is analyzed at a lower frequency, such as once per five seconds, but each segment containing a participant in the conference is scanned at a higher frequency, such as once per second, to maintain responsiveness to participant movement but also allow the full resolution operation.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
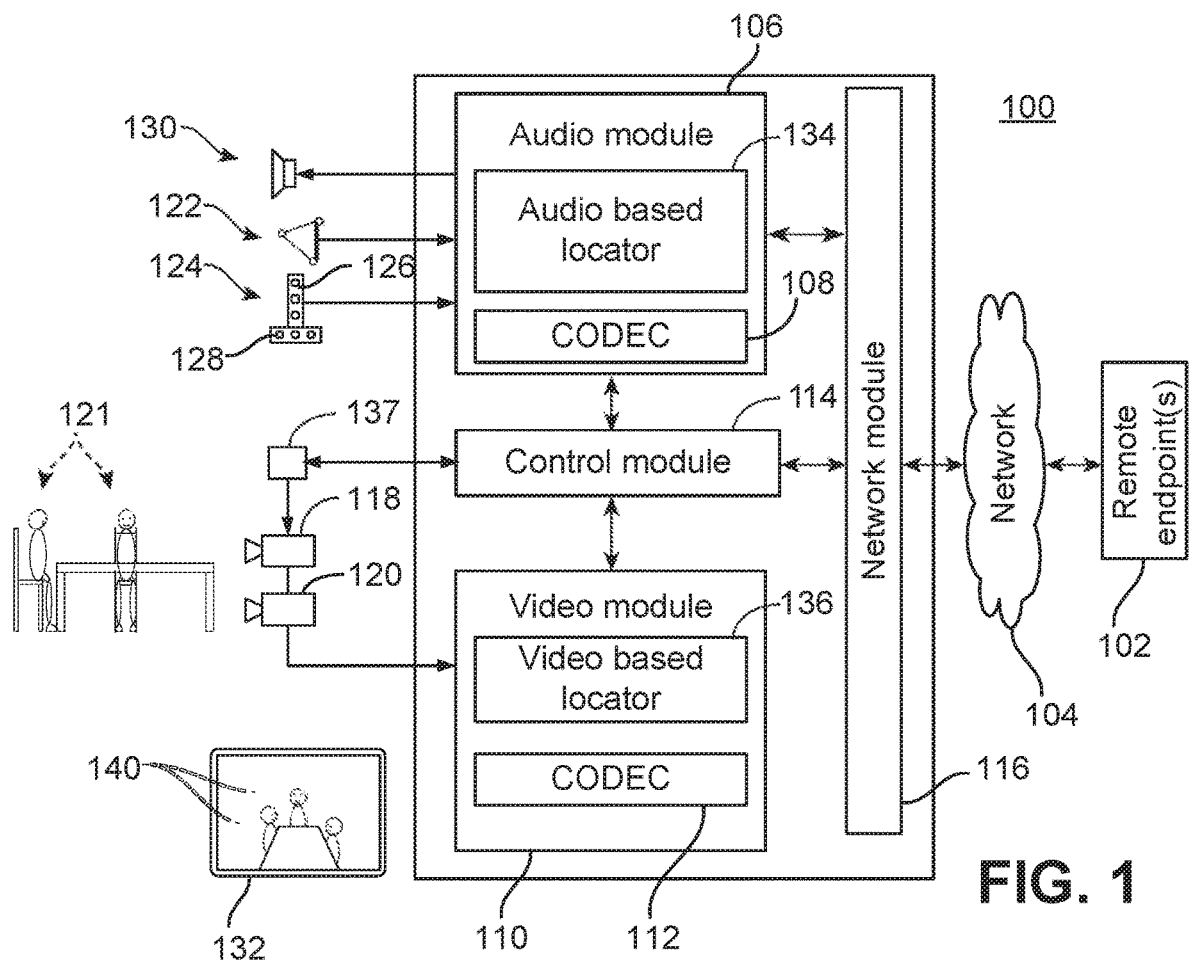
FIG. 1 is an illustration of a videoconferencing endpoint, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world to produce numerical or symbolic information. Computer vision is concerned with artificial systems that extract information from images. Computer vision includes algorithms which receive a video frame as input and produce data detailing the visual characteristics that a system has been trained to detect.

The term computer vison map (also referred to herein as an audio-visual map) includes one or more data structures which receive audio-visual frames as input, stores data pertaining to one or more targets within the audio-visual frames, and tabulates temporal data relating thereto.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

The term video frame can include a still image captured by a video stream or camera.

The term audio visualization process can include one or more system processes which evaluate data from microphones to generate an acoustic 'view' of a room or other such endpoint location.

The term sound source location can refer to a value produced by a system's audio visualization process which is indicative of a horizontal position of a current sound source.

The term audio-visual frame can refer to one or more blocks of data containing computer vision information and audio process information generated at (or corresponding to) a specific moment in time.

The term target can refer to one or more subjects of interest which are tracked using an audio-visual map.

FIG. 1 illustrates a videoconferencing endpoint 100 in accordance with an example of this disclosure. The videoconferencing apparatus or endpoint 100 communicates with one or more remote endpoints 102 over a network 104. Components of the endpoint 100 include an audio module 106 with an audio codec 108 and has a video module no with a video codec 112. Modules 106, 110 operatively couple to a control module 114 and a network module 116. In one or more examples, endpoint 100 includes exactly one wide angle electronic-pan-tilt-zoom camera. In some examples, when a view subject is zoomed in upon, a sub-portion of the captured image containing the subject is rendered, whereas other portions of the image are not.

During a videoconference, one or more cameras (e.g., camera 118 and camera 120) capture video and provide the captured video to the video module 110 and codec 112 for processing. In at least one example of this disclosure, one camera (e.g., 118) is a smart camera and one camera (e.g., 120) is not a smart camera. In some examples, two or more cameras (e.g., camera 118 and camera 120) are cascaded such that one camera controls some or all operations of the other camera. In some examples, two or more cameras (e.g., camera 118 and camera 120) are cascaded such that data captured by one camera is used (e.g., by control module 114) to control some or all operations of the other camera. Additionally, one or more microphones 122 capture audio and provide the audio to the audio module 106 and codec 108 for processing. These microphones 122 can be table or ceiling microphones, or they can be part of a microphone pod or the like. In one or more examples, the microphones 122 are tightly coupled with one or more cameras (e.g., camera 118 and camera 120). The endpoint 100 uses the audio captured with these microphones 122 primarily for the conference audio.

As shown in FIG. 1, an endpoint 100 also includes microphone array 124, in which subarray 126 is orthogonally arranged with subarray 128. Microphone array 124 also captures audio and provides the audio to the audio module 106 for processing. In some examples, microphone array 124 includes both vertically and horizontally arranged microphones for determining locations of audio sources, e.g., people who are speaking. In some examples, microphone array 124 includes only horizontally arranged microphones. In some examples, the endpoint 100 uses audio from the microphone array 124 primarily for camera tracking purposes and not for conference audio. In some examples, endpoint 100 uses audio from the microphone array 124 for both camera tracking and conference audio.

After capturing audio and video, the endpoint 100 encodes the audio and video in accordance with an encoding standard, such as MPEG-1, MPEG-2, MPEG-4, H.261, H.263, H.264 and H.265. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 100 also includes a loudspeaker 130 which outputs conference audio, and a display 132 outputs conference video.

In at least one example of this disclosure, the endpoint 100 uses the two or more cameras 118, 120 in an automated and coordinated manner to handle video and views of the videoconference environment dynamically. In some examples, the first camera (e.g. 118) is a fixed or room-view camera, and the second camera 120 is a controlled or people-view camera. Using the room-view camera (e.g. 118), the endpoint 100 captures video of the room or at least a wide or zoomed-out view of the room that would typically include all the videoconference participants 121 as well as some of their surroundings.

According to some examples, the endpoint 100 uses the people-view camera (e.g., 120) to capture video of one or more participants, including one or more current talkers, in a tight or zoomed-in view. In at least one example, the people-view camera (e.g., 120) can pan, tilt and/or zoom.

In one arrangement, the people-view camera (e.g., 120) is a steerable pan-tilt-zoom (PTZ) camera, while the room-view camera (e.g., 118) is an electronic pan-tilt-zoom (EPTZ) camera. As such, the people-view camera (e.g., 120) can be steered, while the room-view camera (e.g., 118) cannot. In at least one example, both camera 118 and camera 120 are EPTZ cameras. In at least one example, camera 118 is associated with a audio based locator module 134. In fact, both cameras 118, 120 can be steerable PTZ cameras.

In some examples, the endpoint 100 will alternate between tight views of a speaker and wide views of a room. In some examples, the endpoint 100 alternates between two different tight views of the same or different speaker. In some examples, the endpoint 100 will capture a first view of a person with one camera and a second view of the same person with another camera and determine which view is better for sharing with a remote endpoint 102.

In at least one example of this disclosure, the endpoint 100 outputs video from only one of the two cameras 118, 120 at any given time. As the videoconference proceeds, the output video from the endpoint 100 can switch from the view of one camera to another. In accordance with some examples, the endpoint 100 outputs a room-view when there is no participant speaking a people-view when one or more participants 121 are speaking.

In accordance with an example, the endpoint 100 can transmit video from both cameras 118, 120 simultaneously, and the endpoint 100 can let the remote endpoint 102 decide which view to display, or determine that one view will be displayed relative the other view in a specific manner. For example, one view can be composited as a picture-in-picture of the other view.

In one or more examples, the endpoint 100 uses audio-based locator 134 and a video-based locator 136 to determine locations of participants 121 and frame views of the environment and participants 121. The control module 114 uses audio and/or video information from these locators 134, 136 to crop one or more captured views, such that one or more subsections of a captured view will be displayed on a display 132 and/or transmitted to a remote endpoint 102. In some examples, commands to one or both cameras 118, 120 are implemented by an actuator or local control unit 138 having motors, servos, and the like to steer one or both cameras 118, 120 mechanically. In some examples, such camera commands can be implemented as electronic signals by one or both cameras 118, 120.

A wide view from one camera (e.g., 118) can give context to a zoomed view from another camera (e.g., 120) so that participants 121 at the remote endpoint 102 see video from one camera (e.g., 118) as the video from the other camera (e.g., 120) is being adjusted. In some examples, transitions between the two views from the cameras 118, 120 can be faded and blended to avoid sharp cut-a-ways when switching between camera views. In some examples, a switch from a first view to a second view for transmission to a remote endpoint 102 will not occur until an active participant 121 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 121 at an endpoint 100, the cultural niceties of the participants 140 at the remote endpoint 102, and the sizes of one or more displays 132 displaying captured views.

Figure 2:
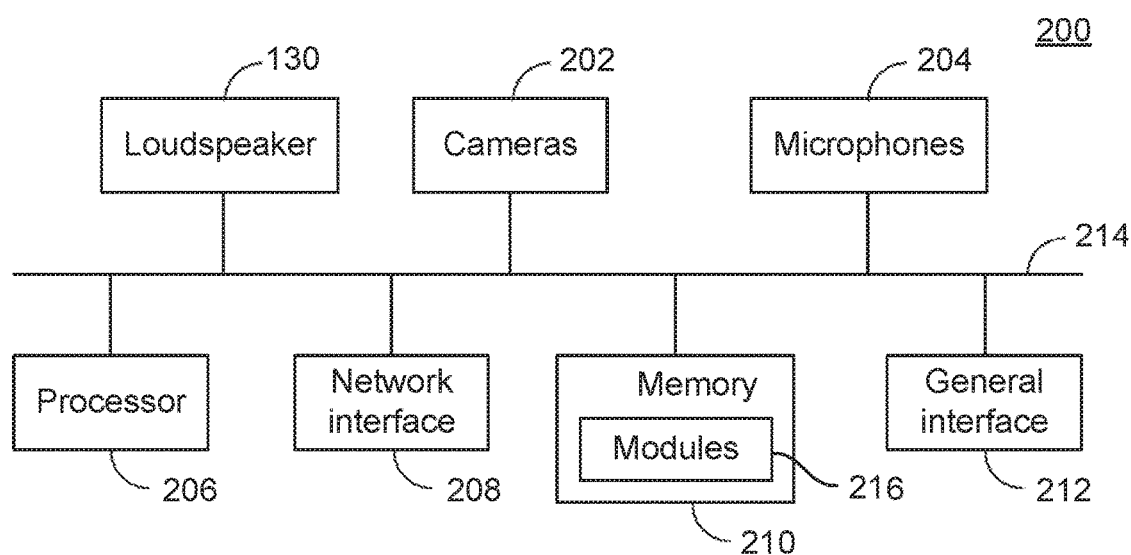
FIG. 2 is an illustration of aspects of the videoconferencing endpoint of FIG. 1.

FIG. 2 illustrates aspects of videoconferencing endpoint 200 (e.g., 100), in accordance with an example of this disclosure. The endpoint 200 includes a loudspeaker 130, cameras 202 (e.g., 118, 120) and microphones 204 (e.g., 122, 124) interfaced to a bus 101. The endpoint 200 also includes a processing unit 206, a network interface 208, a memory 210 and an input/output general interface 212, all coupled by bus 101.

The processing unit 206 can include digital signal processors (DSPs), central processing units (CPUs), graphics processing units (GPUs), dedicated hardware elements, such as neural network accelerators and hardware codecs, and the like in any desired combination.

The memory 210 can be any conventional memory or combination of types of conventional memory, such as SDRAM and flash memory, and can store modules 216 in the form of software and firmware, generically programs, for controlling the endpoint 200. In addition to software and firmware portions of the audio and video codecs (108, 112), the audio and video based locators (134, 136) and other modules discussed previously, the modules 216 can include operating systems, a graphical user interface (GUI) that enables users to control the endpoint 200, and algorithms for processing audio/video signals and controlling the cameras 202. SDRAM can be used storing video images of video streams and audio samples of audio streams and can be used for scratchpad operation of the processing unit 206. In at least one example of this disclosure, one or more of the cameras 202 can be a panoramic camera.

The network interface 208 enables communications between the endpoint 200 and remote endpoints (102). In one or more examples, the general interface 212 provides data transmission with local devices such as a keyboard, mouse, printer, overhead projector, display, external loudspeakers, additional cameras, and microphone pods, etc.

The cameras 202 and the microphones 204 capture video and audio, respectively, in the videoconference environment and produce video and audio signals transmitted through the bus 214 to the processing unit 206. In at least one example of this disclosure, the processing unit 206 processes the video and audio using algorithms in the modules 216. For example, the endpoint 200 processes the audio captured by the microphones 204 as well as the video captured by the cameras 202 to determine the location of participants 121 and control and select from the views of the cameras 202. Processed audio and video can be sent to remote devices coupled to network interface 208 and devices coupled to general interface 212. This is just one example of the configuration of an endpoint 100 and other configurations are well known.

Figure 3:
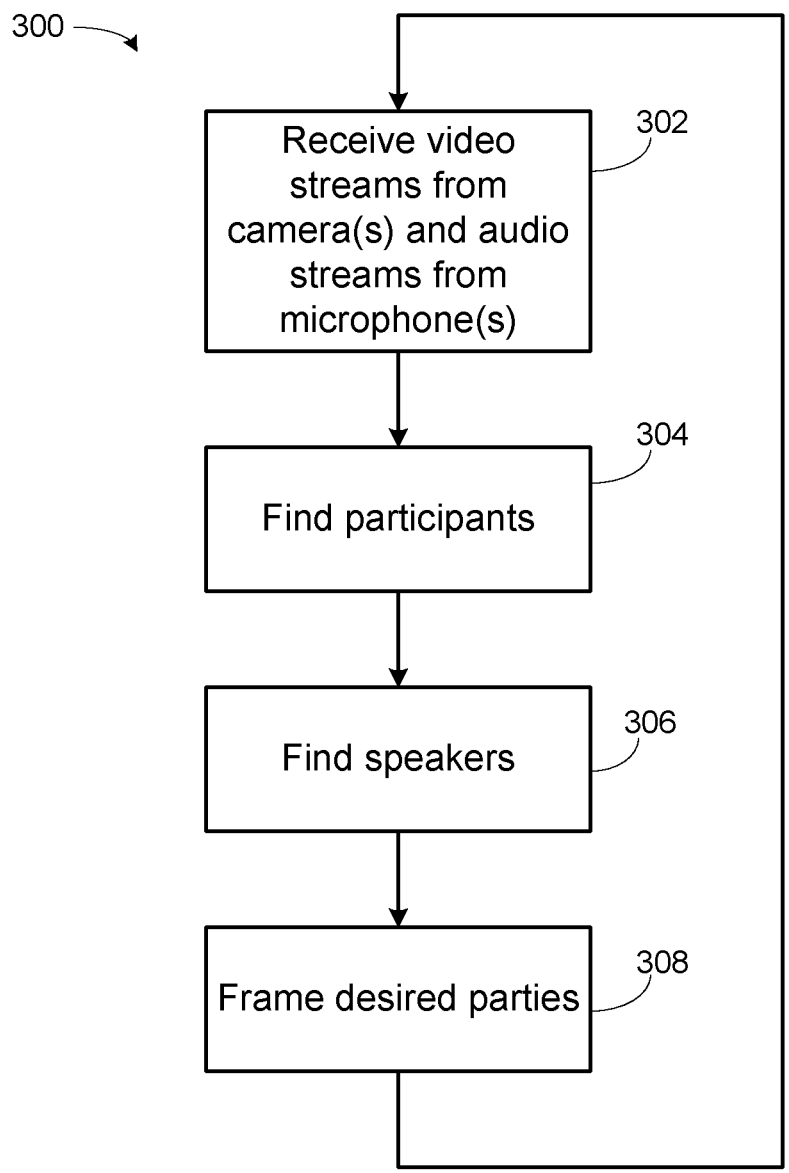
FIG. 3 is a high-level flowchart of participant framing operations of a videoconferencing endpoint.

Referring now to FIG. 3, a high-level flowchart 300 of participant framing is illustrated. In step 302, video streams are received from any cameras and audio streams are received for any microphones. In step 304, participants are located, generally using face or body finding in the video streams using the video based locator 136. There a number of sub-modules in the video based locator 136, but of interest in this disclosure is a neural network sub-module in the video based locator 136 that performs face and body finding operations. Improvements in this step are described below. In step 306, the audio streams are used in combination with the video streams to find speakers. After the speakers are found in step 306, in step 308 the parties are framed as desired. Examples of framing decisions include U.S. Pat. Nos. 10,187,579 and 10,778,941, which are hereby incorporated by reference.

Figure 4:
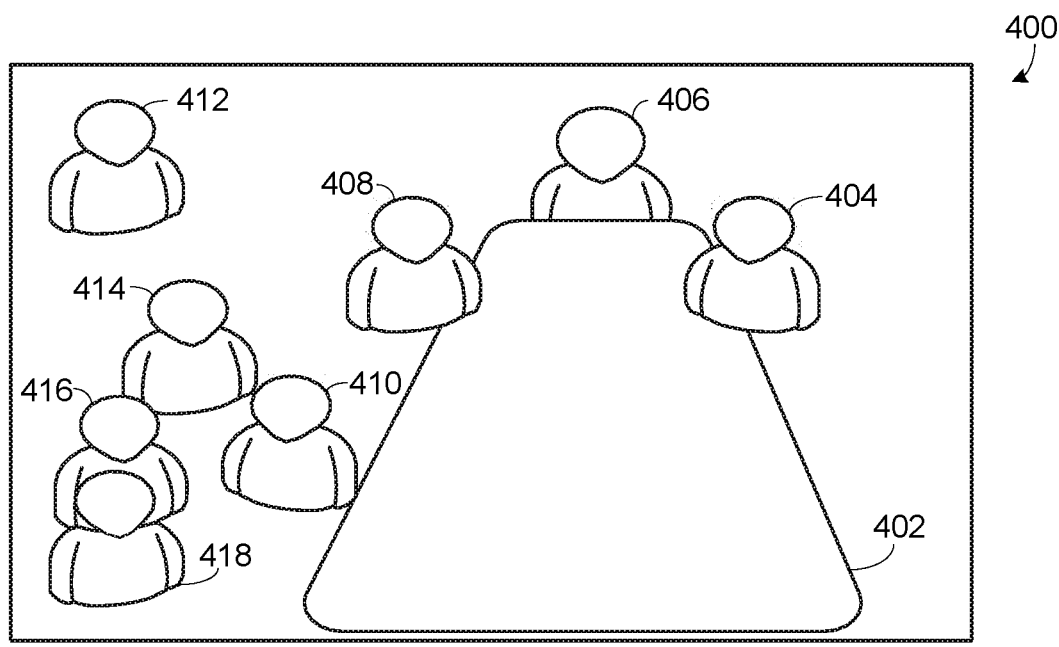
FIG. 4 is an illustration of a conference room and a number of participants to illustrate framing.

FIG. 4 represents an exemplary image 400 of a conference room containing eight participants. A conference table 402 is present, with participants 404, 406, 408 and 410 around the conference table 402 and participants 412, 414, 416 and 418 to the left side of the conference table 402.

Figure 5:
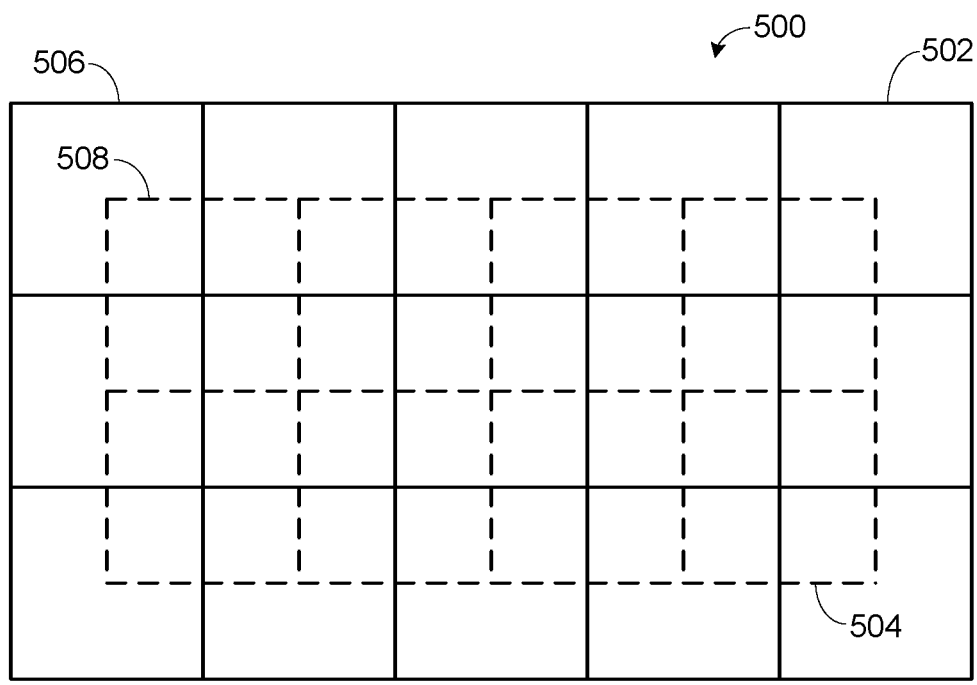
FIG. 5 is an illustration of a grid division of a camera image, with primary and alternate grids, in accordance with an example of this disclosure.

FIG. 5 illustrates an image divided into segments of a primary grid 502 and an alternate grid 504. Each segment is preferably sized so that downsampling by a neural network is not required for efficient operations. In one example, a segment size of 256 pixels by 240 pixels is utilized. If the image is 1280 pixels by 720 pixels, the primary grid 502 is divided into 5×3 segments. Of course, other segment sizes and image sizes can be used depending on the source image size and the processing capabilities available. It has been found that a 256×240 segment can be computed fast enough on reasonably priced digital signal processors (DSPs) to provide good results and allow sufficient computing resources for the other operations in the videoconferencing device.

Having the input image to the neural network at 256×240 removes a need for the neural network to downsample the image for efficient operations. By not downsampling, more pixels are available to contain participant faces and bodies. This allows participants that are farther from the camera to be recognized. For example, if the neural network is trained to detect faces that are at least 32×32 pixels, utilizing full resolution 256×240 segments versus a 1280×720 image downsized to 256×240 pixels, allows a participant to be significantly farther away from the camera. In one case, a participant detected at five to seven feet using a downsampled approach can be detected at greater than 20 feet using the full resolution techniques described herein.

Because each segment is analyzed individually by a neural network, the participants near an edge of a segment may not be recognized using the neural network, as insufficient facial or body pixels may be present. Therefore, an alternate grid 504 is developed, where the corners of the segments of the alternate grid 504 segments are the centers of the segments in the primary grid 502. This results in a 4×2 segment alternate grid in the example of FIG. 5. By having the alternate grid 504 segments shifted from the primary grid 502, the probability of finding participants that were at the edges of primary grid 502 segments is increased as the alternate grid 504 is sufficiently offset to allow many of the missed participants to be identified. Of course, other alternate grid relationships to the primary grid can be used depending on processing capability, segment size and image size.

Figure 6:
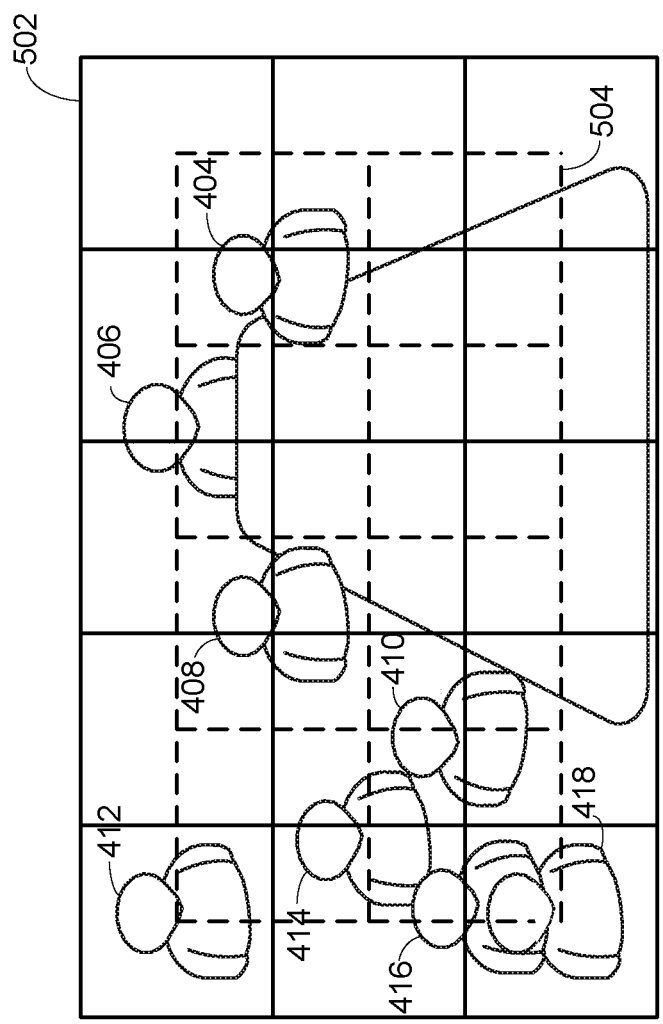
FIG. 6 is the grid division of FIG. 5 overlaid over the participants of FIG. 4.
Figure 7:
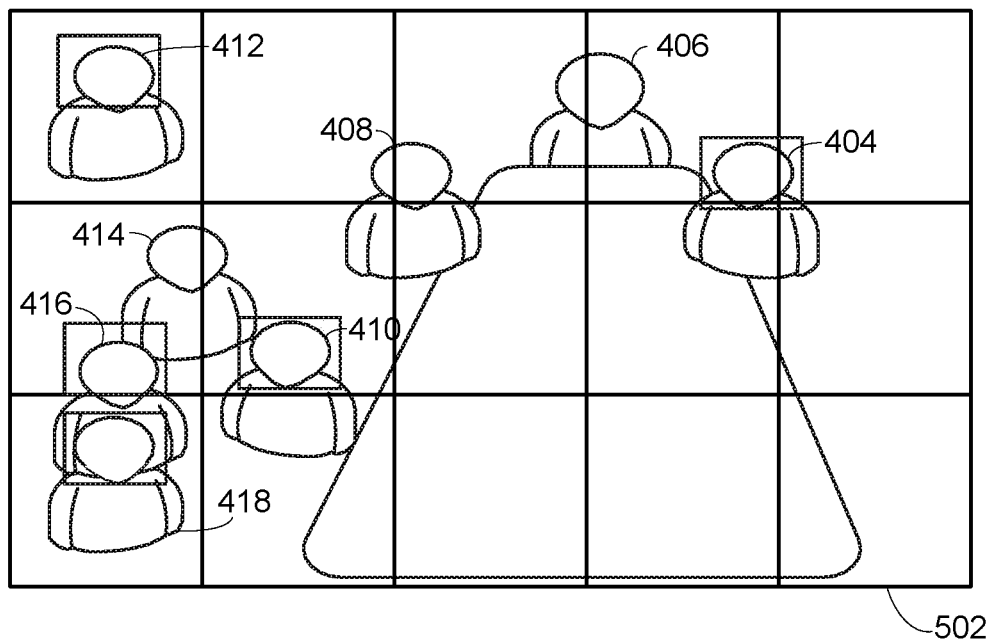
FIG. 7 is an illustration of the participants found using the primary grid of FIG. 4.
Figure 8:
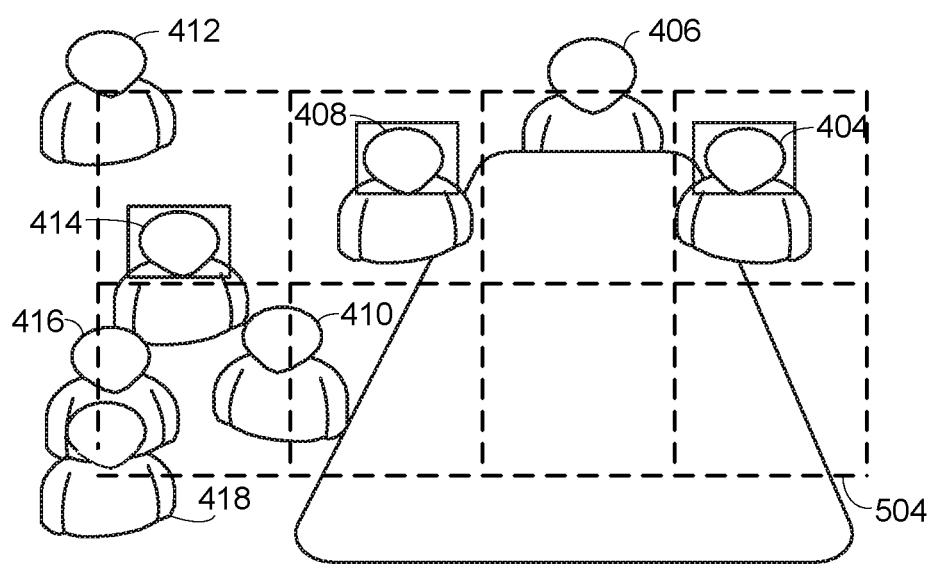
FIG. 8 is an illustration of the participants found using the alternate grid of FIG. 4.

The advantage of the alternate grid 504 is illustrated in FIGS. 6, 7 and 8. Referring to FIG. 6, where the primary grid 502 and the alternate grid 504 are overlaid over the image of FIG. 4, it can be seen that participants 414, 408 and 406 are at segment boundaries in the primary grid 502. As a result, there is a high probability that the neural network will not detect their faces or bodies and therefore not detect the presence of participants 406, 408 and 414. However, viewing the relationship of participants 406, 408 and 414 to the alternate grid 504 shows that participants 408 and 414 will be readily detected by the neural network when analyzing the segments of the alternate grid 504. Participant 406 may not be detected as participant 406 is at the edge of segments in both the primary grid 502 and the alternate grid 504.

FIG. 7 shows that participants 410, 416, 418, 412 and 404 have been detected by the neural network in analyzing the segments of the primary grid 502, as indicated by the bounding boxes around the faces. However, because of their location next to edges or boundaries of segments of the primary grid 502 participants 406, 408 and 414 were not detected. However, in FIG. 8, participants 408 and 414 were detected as they are clearly inside segments of the alternate grid 504. By using the alternate grid 504 in conjunction with the primary grid 502, the potential disadvantage of detection problems at the edge of a segment is reduced so that only participants at the outer periphery of the image would not be detected, such as participant 406.

Each segment of the primary grid 502 and the alternate grid 504 is sized for efficient operation of the neural network, such as by being 256 pixels by 240 pixels, removing the need for downsampling and simplifying the remaining stages in the neural network. In the present example, 23 segments must be analyzed to detect participants. While the processing of an individual segment by the neural network is efficient, the increased number of segments to be analyzed increases the time to check participants in the total image. If, for example, a neural network can analyze a full image containing three participants using downsampling methods in 600-1200 milliseconds, an equivalent neural network not using downsizing is able to analyze one segment in 50 milliseconds. However, participant movement is relatively slow compared to frame rates and the analysis rates of the neural network. For videoconferencing applications it has been determined that the entire frame need only be analyzed at a much lower frequency, such as once per five seconds, particularly if computer vision mapping techniques as described in U.S. patent application Ser. No. 16/773,421, filed Jan. 27, 2020, entitled "Context Based Target Framing in a Teleconferencing Environment," which is hereby incorporated by reference, are used. In the computer vision mapping techniques of Ser. No. 16/773,421, locations of each participant are maintained in a map, with a weight or presence value being incremented each time the participant is recognized at the location and decremented each time the participant is not recognized at the location. When the weight value exceeds a given value, the participant is considered present and when below a given value, the participant is no longer considered present at that location. The present status is used in the framing decisions. This incrementing or decrementing against given values provides filtering of the detection results.

For the example of 23 segments, this allows around 220 milliseconds to be used to scan each segment to meet the five second goal. Using the 50-millisecond analysis time, an entire frame of segments requires 1.15 seconds, leaving time for other processing. While this time is generally greater than the full image scan, it must be remembered that this is a full resolution analysis as opposed to a downsampled analysis.

To make the framing of the participants more responsive while allowing reduced computational use, it is desired that the segments containing participants be scanned more frequently, such as at one second intervals. The segments where participants have not been found are scanned at a slower rate, such as five seconds. This is satisfactory as it generally only applies to cases where the participant has just entered the room. Once in the room, the segments containing the participant are scanned at the higher rate, such as one per second. By scanning fewer segments at a higher rate, the overall apparent responsiveness is increased while using less computational resources than if the full image scan was performed at a rate sufficient to have a similar apparent responsiveness. Using the example of three participants in different segments, the computation time is 1.75 seconds, 1.00 seconds for twenty segments in five seconds and 0.75 seconds for the three segments once per second for five seconds. To begin to approach this level of responsiveness, the full scan might need to be run at least three times per five seconds, thus using 1.8 to 3.6 seconds per five seconds, all higher computational loads than the segmented approach with the higher scan rate for segments with previous participant detection, but again it must be remembered that the segmented scan is more accurate as it is a full resolution analysis. For the example of FIGS. 7 and 8, which is a near worst case scenario because of the large number of participants, the time becomes 2.55 seconds, sixteen segments once per five seconds and seven segments five times in the five seconds. This 2.55 seconds used every five seconds allows sufficient time for the other operations of the videoconferencing unit to occur, but if more time is needed, the one second scan rate can be reduced to values such as 1.5 seconds or 1.667 seconds.

By segmenting the image and processing segments containing participants more frequently, full resolution processing can be done, to increase the distance from the camera for participant detection, and yet participant movements can be closely tracked, providing more responsiveness.

Figure 9:
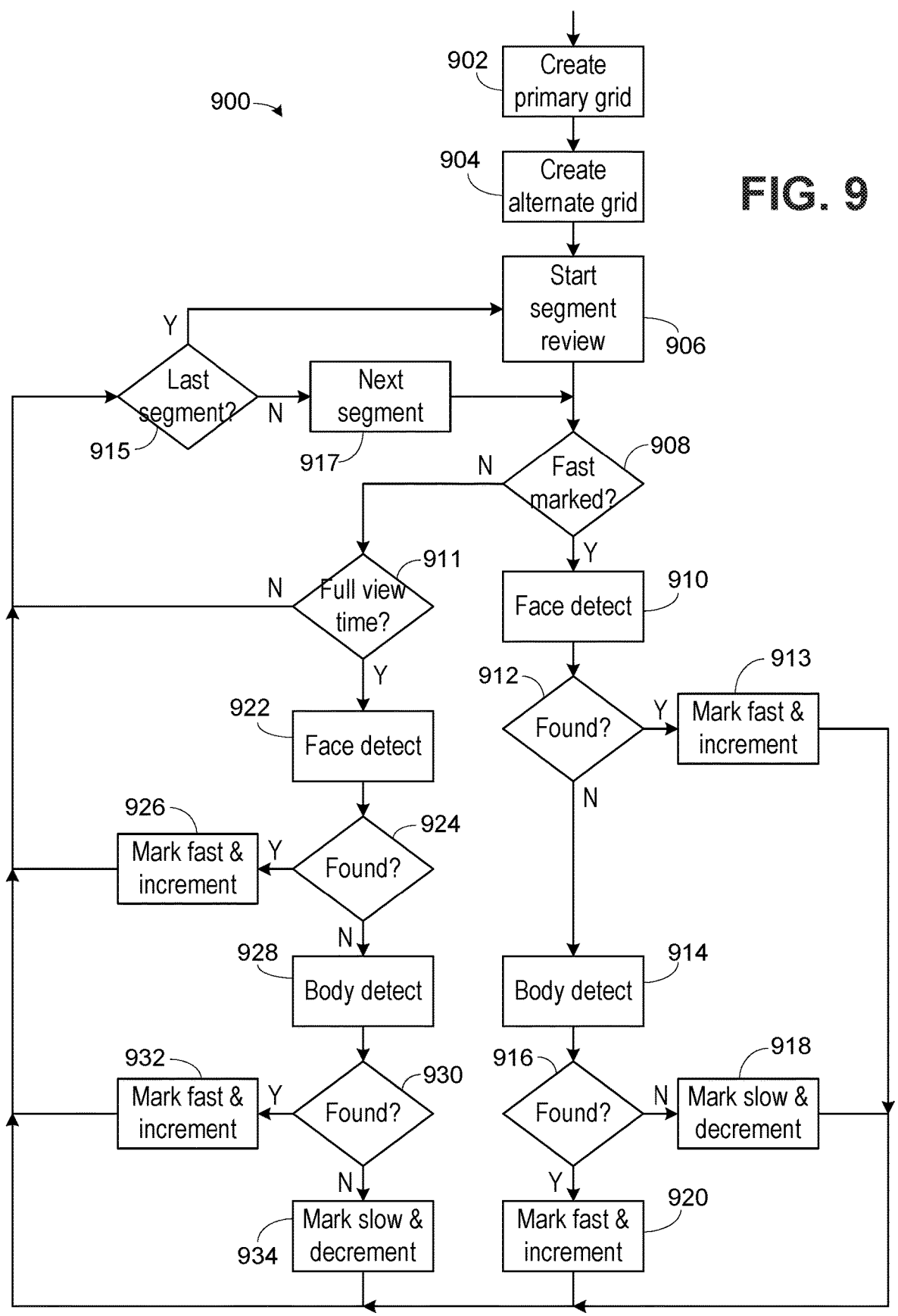
FIG. 9 is a flowchart of participant detection, in accordance with an example of this disclosure.

Referring to FIG. 9, a flowchart of segment analysis for the face detection operation is provided. In step 902, the primary grid 502 is developed. In step 904, the alternate grid 504 is developed. In step 906, segment review is started. Referring to the grid of FIG. 5, the first segment is the upper left segment 506. The segments are preferably raster scanned, the primary grid 502 first, followed by the upper left segment 508 of the alternate grid 504. In step 906 the segment 506 is chosen for review. In step 908 it is determined if the segment is marked as fast in a segment review frequency table. As discussed previously, preferably a segment containing found faces or bodies is reviewed at a higher frequency, such as once per second, as opposed to the overall frequency rate of review of the entire image, such as once per five seconds. The segment review frequency table is used to keep track of the review frequency, fast or slow. If the segment has had a face or body detected in previous analysis, that segment is marked fast and thus is reviewed more frequently.

If the segment is not marked fast as determined in step 908, in step 911 it is determined if the full frame view time for the segment has been reached, such as the five second period. The segment review frequency table also contains a timestamp for the last time the segment was analyzed, allowing the full frame time determination. If not, in step 915 a determination is made if the last segment has been analyzed, such as the last segment in the alternate grid 504. If so, operation proceeds to step 906 to start review of the segments at the first segment. If not the last segment in step 912, in step 917 the next segment to be analyzed is selected and operation proceeds to step 908.

As determined in step 908, if the segment is marked fast, in step 910 face detection is performed on the segment using the neural network. Any desired face detection neural network algorithm can used, with the neural network reconfigured to remove any downsampling operations. Examples are described in PCT Application Publications Nos. WO 2020/103068 A1 and WO 2020/103078 A1, which are hereby incorporated by reference, which examples may have the pooling layers removed or modified to eliminate downsampling. In step 912, it is determined if a face has been found. If so, in step 913 the segment is marked fast in the segment review frequency table and a presence value is incremented in the computer vision map for each face that was found. If a face was not found as determined in step 912, in step 914 body detection is performed by the neural network. Body detection is used in case the participant is not looking at the camera, is seated too far away or is wearing a mask, all conditions where face detection conventionally fails. Because of the much smaller computational time of the small segments, body detection can be used in addition to face detection as the added computational time is nominal. In step 916, it is determined if a body is detected in the segment. If not, in step 918 the segment is now marked slow, neither a face nor a body having been found in the segment, and the presence value in the computer vision map is decremented for each participant in the segment. It is understood that a segment may have had two or more participants previously and now only has one (or less than before) identified. In that case, the found participant's presence value is incremented and the presence value of the participant that is no longer present is decremented. If a body is found as determined step 916, in step 920 the segment is marked fast and the presence value is incremented. After steps 913, 918 or 920 operation proceeds to step 915.

In step 910 if it is determined that it is full view time for the particular segment, in step 922 face detection is performed by the neural network for that segment. In step 924, it is determined if a face has been found. If so, in step 926 the segment is marked fast and the presence value in the computer vision map is incremented. If in step 924 a face was not found, in step 928 body detection is performed by the neural network for the reasons mentioned above. In step 930, a determination is made whether a body was detected for the segment. If so, in step 932 the segment is marked fast and the presence value is incremented. If a body was not found, in step 934 the segment is marked slow to be analyzed only at full view time and any presence value is decremented. After steps 926, 932 or 934, operation proceeds to step 915.

It is understood that the body detection operations can be omitted if desired or if necessary for computational resource reasons. Alternatively, the face detection operations can be omitted and only body detection operations performed for the same reasons.

While detection or lack of detection in a segment is illustrated as occurring only once to change the fast or slow state of the segment, it is understood that this determination can be filtered, for example by using techniques similar to the computer vision mapping method.

While it is preferred that the video frame be analyzed at full resolution, it is acceptable that some downsampling, but less than the normal amounts of downsizing, can occur as any reduction in downsampling allows participants to be detected farther from the camera. For example, the 1280×720 image could be downsampled to 640×360 and then divided into segments of 320×180, with the primary grid being 2×2 and the alternate grid a single segment. This configuration is an improvement on a case where the 1280×720 image is downsampled to a single 320×180 image, providing higher resolution for neural network analysis and thus allowing participants to be detected farther from the camera then the single downsampled variant, but not as far as the full resolution configuration. This intermediate approach could be used where processing capacity that can be provided for the neural network operation is insufficient for full resolution operation but sufficient capacity for the intermediate approach is available.

The segments described above have been uniformly sized. It is understood that segments can be of varying sizing, for example one segment being smaller, such as one-half, than another segment. This allows dividing the video image into whole and fractional segments to allow better matching of available processing capabilities to the video image size.

A frame to be analyzed is divided into segments. The segment is sized to allow the neural network to operate on full resolution image data, which increases the distance a given participant can be from the camera and be identified. A primary grid covers the entire frame and an alternate grid is offset from the primary grid to reduce segment edge limitations. The entire frame is analyzed at a first, slow rate and segments that contain participants or have recently contained participants are reviewed at a second, higher rate. By having the segmentation and two different analysis rates, full resolution analysis can be performed to detect participants farther from the camera and participant tracking remains dynamic even though the overall frame participant scan rate remains low.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:
1. A method for detecting participants in a videoconferencing video stream, the method comprising:
   obtaining a video image from the video stream;

dividing the entire video image into a first plurality of segments based on a primary grid;

dividing the video image into a second plurality of segments based on an alternate grid that is offset from the primary grid;

performing first participant detection on the video image based on the first plurality of segments individually, wherein the first participant detection is indicative of a first count of participants in the video image; and performing second participant detection on the video image based on the second plurality of segments individually, wherein the second participant detection is indicative of a second count of participants that is higher than the first count of participants, and wherein at least one participant detected by the second participant detection is not detected by the first participant detection based on the at least one participant being located next to an edge or a boundary of a segment in the first plurality of segments.

2. The method of claim 1, wherein the video image has a resolution, and wherein the resolution of the first plurality of segments and the second plurality of segments is not reduced from the resolution of the video image.

3. The method of claim 1, wherein the video image has a resolution, and wherein the resolution of the first plurality of segments and the second plurality of segments is reduced from the resolution of the video image.

4. The method of claim 1, wherein the performing the first participant detection on the video image based on the first plurality of segments individually and the performing the second participant detection on the video image based on the second plurality of segments individually are performed to provide participant detection of the video image in a first period.

5. The method of claim 4, wherein the performing the first participant detection on the video image based on first plurality of segments individually is performed for a segment containing a detected participant or having contained a detected participant in a second period, the second period being shorter than the first period.

6. The method of claim 1, wherein the performing the first participant detection on the video image based on the first plurality of segments individually and the performing the second participant detection on the video image based on the second plurality of segments individually comprises performing face detection on each segment.

7. The method of claim 6, wherein the performing the first participant detection on the video image based on the first plurality of segments individually and the performing the second participant detection on the video image based on the second plurality of segments individually comprises performing body detection on each segment if a face is not detected.

8. A videoconferencing device comprising:
a camera interface for receiving a videoconferencing video stream;
a processor for executing programs and operations to perform videoconferencing operations; and
memory coupled to the processor for storing programs executed by the processor, the memory storing programs executed by the processor to perform participant detection of the videoconferencing video stream by:
obtaining a video image from the video stream,
dividing the entire video image into a first plurality of segments based on a primary grid,
dividing the video image into a second plurality of segments based on an alternate grid that is offset from the primary grid,
performing first participant detection on the video image based on the first plurality of segments individually, wherein the first participant detection is indicative of a first count of participants in the video image, and
performing second participant detection on the video image based on the second plurality of segments individually, wherein the second participant detection is indicative of a second count of participants that is higher than the first count of participants, and wherein at least one participant detected by the second participant detection is not detected by the first participant detection based on the at least one participant being located next to an edge or a boundary of a segment in the first plurality of segments.

9. The videoconferencing device of claim 8, wherein the video image has a resolution, and wherein the resolution of the first plurality of segments and the second plurality of segments is not reduced from the resolution of the video image.

10. The videoconferencing device of claim 8, wherein the video image has a resolution, and wherein the resolution of the first plurality of segments and the second plurality of segments is reduced from the resolution of the video image.

11. The videoconferencing device of claim 8, wherein the performing the first participant detection on the video image based on the first plurality of segments individually and the performing the second participant detection on the video image based on the second plurality of segments individually are performed to provide participant detection of the video image in a first period.

12. The videoconferencing device of claim 11, wherein the performing the first participant detection on the video image based on the first plurality of segments individually is performed for a segment containing a detected participant or having contained a detected participant in a second period, the second period being shorter than the first period.

13. The videoconferencing device of claim 8, wherein the performing the first participant detection on the video image based on the first plurality of segments individually and the performing the second participant detection on the video image based on the second plurality of segments individually comprises performing face detection on each segment.

14. The videoconferencing device of claim 13, wherein the performing the first participant detection on the video image based on the first plurality of segments individually and the performing the second participant detection on the video image based on the second plurality of segments individually comprises performing body detection on each segment if a face is not detected.

15. A non-transitory processor readable memory containing programs that when executed cause a processor to perform the following method of detecting participants in a videoconferencing video stream, the method comprising:
obtaining a video image from the video stream;
dividing the entire video image into a first plurality of segments based on a primary grid;
dividing the video image into a second plurality of segments based on an alternate grid that is offset from the primary grid;
performing first participant detection on the video image based on the first plurality of segments individually, wherein the first participant detection is indicative of a first count of participants in the video image; and performing second participant detection on the video image based on the second plurality of segments individually, wherein the second participant detection is indicative of a second count of participants that is higher than the first count of participants, and wherein at least one participant detected by the second participant detection is not detected by the first participant detection based on the at least one participant being located next to an edge or a boundary of a segment in the first plurality of segments.

16. The non-transitory processor readable memory of claim 15, wherein the video image has a resolution, and wherein the resolution of the first plurality of segments and the second plurality of segments is not reduced from the resolution of the video image.

17. The non-transitory processor readable memory of claim 15, wherein the performing the first participant detection on the video image based on the first plurality of segments individually and the performing the second participant detection on the video image based on the second plurality of segments individually are performed to provide participant detection of the video image in a first period.

18. The non-transitory processor readable memory of claim 17, wherein the performing the first participant detection on the video image based on the first plurality of segments individually is performed for a segment containing a detected participant or having contained a detected participant in a second period, the second period being shorter than the first period.

19. The non-transitory processor readable memory of claim 15, wherein the performing the first participant detection on the video image based on the first plurality of segments individually and the performing the second participant detection on the video image based on the second plurality of segments individually comprises performing face detection on each segment.

20. The non-transitory processor readable memory of claim 19, wherein the performing the first participant detection on the video image based on the first plurality of segments individually and the performing the second participant detection on the video image based on the second plurality of segments individually comprises performing body detection on each segment if a face is not detected.

* * * * *